US010025444B2

(12) United States Patent
Kikukawa et al.

(10) Patent No.: US 10,025,444 B2
(45) Date of Patent: Jul. 17, 2018

(54) WIRING BODY AND WIRING BOARD

(71) Applicant: FUJIKURA LTD., Tokyo (JP)

(72) Inventors: Naohiro Kikukawa, Sakura (JP); Shingo Ogura, Sakura (JP)

(73) Assignee: FUJIKURA LTD., Tokyo (JP)

(*) Notice: Subject to any disclaimer, the term of this patent is extended or adjusted under 35 U.S.C. 154(b) by 50 days.

(21) Appl. No.: 15/128,810

(22) PCT Filed: Apr. 8, 2015

(86) PCT No.: PCT/JP2015/060974
§ 371 (c)(1),
(2) Date: Sep. 23, 2016

(87) PCT Pub. No.: WO2015/156316
PCT Pub. Date: Oct. 15, 2015

(65) Prior Publication Data
US 2017/0102804 A1    Apr. 13, 2017

(30) Foreign Application Priority Data

Apr. 8, 2014 (JP) ................... 2014-079240

(51) Int. Cl.
*G06F 3/047* (2006.01)
*G06F 3/044* (2006.01)

(52) U.S. Cl.
CPC ............. *G06F 3/047* (2013.01); *G06F 3/044* (2013.01); *G06F 2203/04103* (2013.01); *G06F 2203/04112* (2013.01)

(58) Field of Classification Search
CPC ............. G06F 3/044; G06F 2203/04103; G06F 3/041; G06F 3/047; G06F 2203/04112
See application file for complete search history.

(56) References Cited

U.S. PATENT DOCUMENTS

| 2010/0302204 A1 | 12/2010 | Miyayama et al. |
| 2011/0096005 A1 | 4/2011 | Kim et al. |
| 2011/0102361 A1 | 5/2011 | Philipp |
| 2011/0102370 A1 | 5/2011 | Kono et al. |
| 2013/0327560 A1 | 12/2013 | Ichiki |
| 2014/0054070 A1 | 2/2014 | Ichiki |
| 2014/0231120 A1 | 8/2014 | Nakamura |

(Continued)

FOREIGN PATENT DOCUMENTS

| CN | 103425366 A | 12/2013 |
| JP | 2006-344163 A | 12/2006 |

(Continued)

OTHER PUBLICATIONS

Communication dated Nov. 21, 2016 from the Taiwanese Intellectual Property Office in counterpart Application No. 104111195.

(Continued)

*Primary Examiner* — Abhishek Sarma
(74) *Attorney, Agent, or Firm* — Osha Liang LLP

(57) ABSTRACT

A wiring board (10) includes a transparent substrate (20) and a conductor pattern (30) provided on the transparent substrate (20), the conductor pattern (30) includes at least one detection electrode (31) having a mesh shape configured by first fine wires (311) and (312) intersecting each other, and the detection electrode (31) includes first disconnection portions (314) provided in parts except intersection points (315) in the first fine wires (311) and (312).

12 Claims, 12 Drawing Sheets

(56) References Cited

U.S. PATENT DOCUMENTS

2014/0238730 A1    8/2014   Nakamura
2014/0299357 A1   10/2014   Nakamura

FOREIGN PATENT DOCUMENTS

| | | |
|---|---|---|
| JP | 2010-262529 A | 11/2010 |
| JP | 2010-277392 A | 12/2010 |
| JP | 2010-286886 A | 12/2010 |
| JP | 2011-59771 A | 3/2011 |
| JP | 2011-59772 A | 3/2011 |
| JP | 2012-94115 A | 5/2012 |
| JP | 2012-185813 A | 9/2012 |
| JP | 2012-190445 A | 10/2012 |
| JP | 2013-143045 A | 7/2013 |
| JP | 2013-149237 A | 8/2013 |
| TW | 201327315 A1 | 7/2013 |
| TW | 201327317 A1 | 7/2013 |

OTHER PUBLICATIONS

Office Action issued in corresponding Japanese Application No. 2016-512755 dated Feb. 15, 2017, and English translation thereof (8 pages).
International Search Report for PCT/JP2015/060974 dated Jun. 16, 2015 [PCT/ISA/210].
Supplementary Extended European Search Report in a counterpart European Application No. 15 776 277.4 dated Nov. 7, 2017 (9 pages).

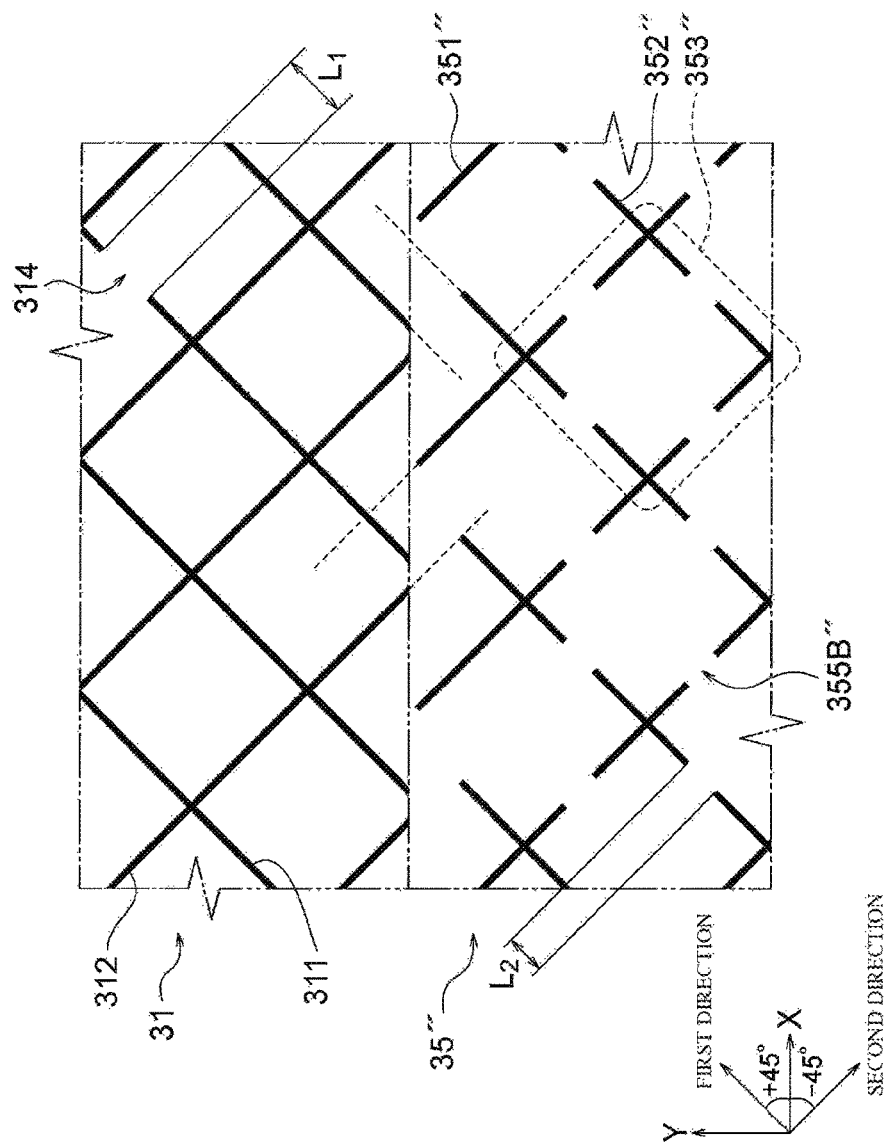

WIRING BODY AND WIRING BOARD

CROSS REFERENCE TO RELATED APPLICATIONS

This application is a National Stage of International Application No. PCT/JP2015/060974, filed on Apr. 8, 2015, which claims priority from Japanese Patent Application No. 2014-079240, filed on Apr. 8, 2014, the contents of all of which are incorporated herein by reference in their entirety.

TECHNICAL FIELD

The present invention relates to a wiring body and a wiring board provided with the wiring body.

In designated nations where incorporation of documents by reference is accepted, the contents disclosed in Japanese Patent Application No. 2014-079240 filed on Apr. 8, 2014 in Japan are incorporated by reference into this specification and are regarded as a portion of the disclosure of this specification.

BACKGROUND ART

There is disclosed a touch panel where disconnection portions disconnecting conductor wires are provided partially in conductor regions of mesh-shaped electrodes in order to improve visibility (refer to, for example, Patent Document 1 (Paragraph [0036] and FIG. 9)).

CITATION LIST

Patent Document

Patent Document 1: JP 2010-262529 A

SUMMARY OF THE INVENTION

Problem to be Solved by the Invention

In the touch panel, since the disconnection portions are formed at intersection portions of the conductor wires, the number of paths conducting in the conductor regions is lowered, so that there is a problem in that reliability of electric connection is deteriorated. On the other hand, if the number of disconnection portions is reduced in order to improve the reliability of electric connection, there is a problem in that the effect of improvement of the visibility cannot be sufficiently achieved.

Problems to be solved by the present invention include providing a wiring body capable of improving visibility while maintaining reliability of electric connection of a wiring board and a wiring board including the wiring body.

Means for Solving Problem

[1] A wiring body according to the invention including: an insulating layer; and a conductor pattern provided on the insulating layer, wherein the conductor pattern includes at least one detection electrode having a mesh shape configured by first fine wires intersecting each other, and the detection electrode includes first disconnection portions formed in parts except intersection points of the first fine wires.

[2] In the above invention, the conductor pattern may include the detection electrodes arranged to be parallel to each other and at least one dummy electrode interposed between the detection electrodes and having a mesh shape configured by second fine wires intersecting each other, and the dummy electrode may include at least one second disconnection portion.

[3] In the above invention, the dummy electrode may include unit meshes having substantially the same shape as unit meshes included in the detection electrode.

[4] In the above invention, the unit meshes included in the detection electrode and the unit meshes included in the dummy electrode may be shifted from each other in a direction perpendicular to an arrangement direction of the detection electrode and the dummy electrode.

[5] In the above invention, a length of the second disconnection portion may be larger than a width of the second fine wire.

[6] In the above invention, the following Formula (1) may be satisfied.

$$W_2 \times 5 \geq L_2 \qquad (1)$$

in the Formula (1), $L_2$ denotes a length of the second disconnection portion, and $W_2$ denotes a width of the second fine wire.

[7] In the above invention, the following Formula (2) may be satisfied.

$$|A_1 - A_2| \leq 1 \qquad (2)$$

in the Formula (2), $A_1$ denotes an aperture ratio of the detection electrode, and $A_2$ denotes an aperture ratio of the dummy electrode.

[8] In the above invention, the first disconnection portion may be formed at a center of a side between the intersection points of the first fine wires.

[9] In the above invention, one of the first disconnection portions may be formed for one of the unit meshes included in the detection electrode.

[10] In the above invention, the conductor pattern may include the detection electrodes arranged to be parallel to each other and at least one third disconnection portion formed at the intersection point of the first fine wires which the detection electrodes adjacent to each other respectively include.

[11] In the above invention, the conductor pattern may further include at least one third disconnection portion formed at the intersection point of the first wire which the detection electrode includes and second fine wire which the dummy electrode adjacent to the detection electrode includes.

[12] According to the invention, there is provided a wiring board including the wiring body above described, in which the insulating layer is a base material which supports the conductor pattern or, the insulating layer is an adhesive layer with which the conductor pattern bonds to a base material.

Effect of the Invention

According to the invention, since the first disconnection portions are formed at positions other than the intersection points of the first fine wires, it is possible to improve the visibility while maintaining the reliability of electric connection of the wiring board.

BRIEF DESCRIPTION OF DRAWING

FIG. 11 is an enlarged plan diagram illustrating part XI in FIG. 10.

MODE (S) FOR CARRYING OUT THE INVENTION

Hereinafter, embodiments of the invention will be described with reference to the drawings.

First Embodiment

Figure 1:
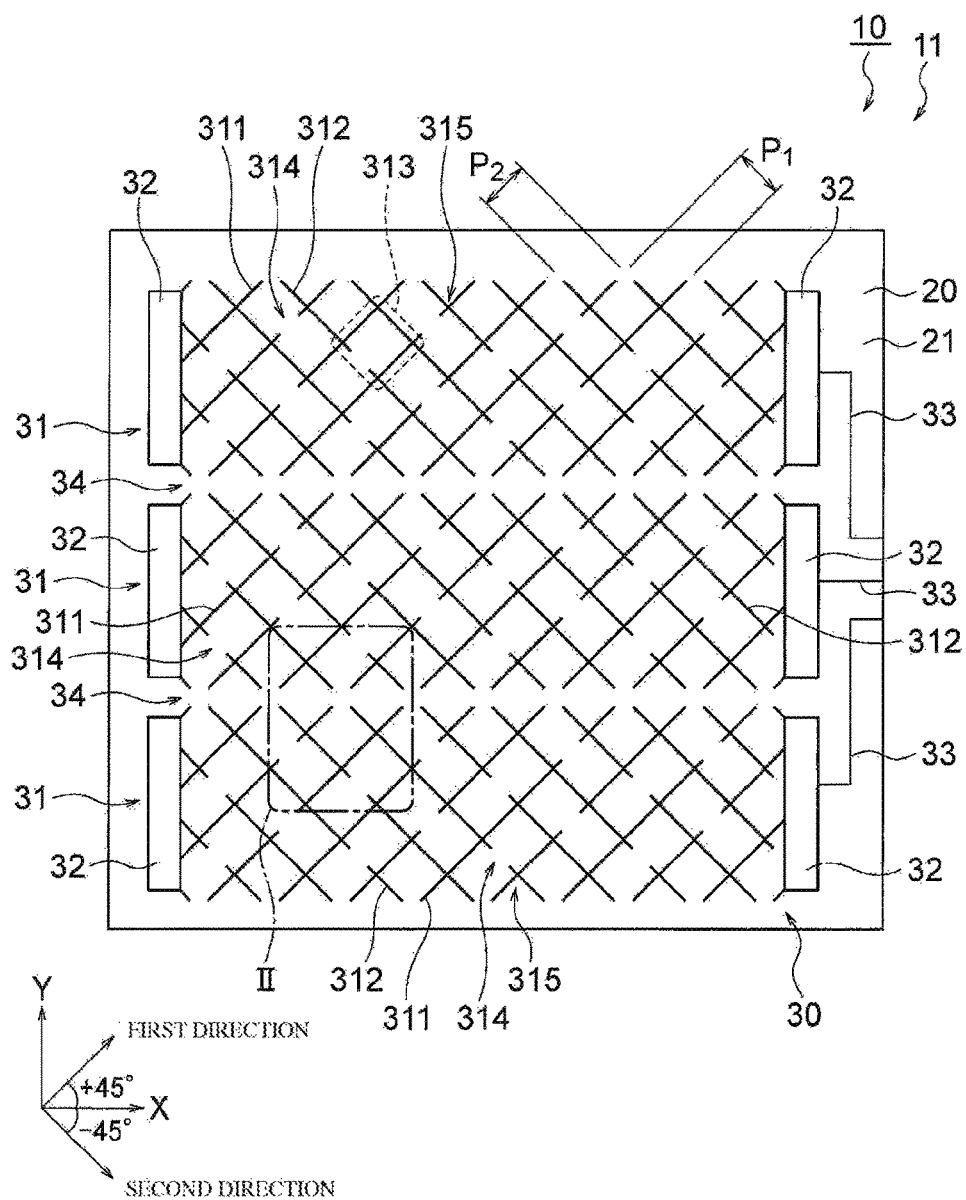
FIG. 1 is a plan diagram illustrating a wiring board according to a first embodiment of the invention.
Figure 2:
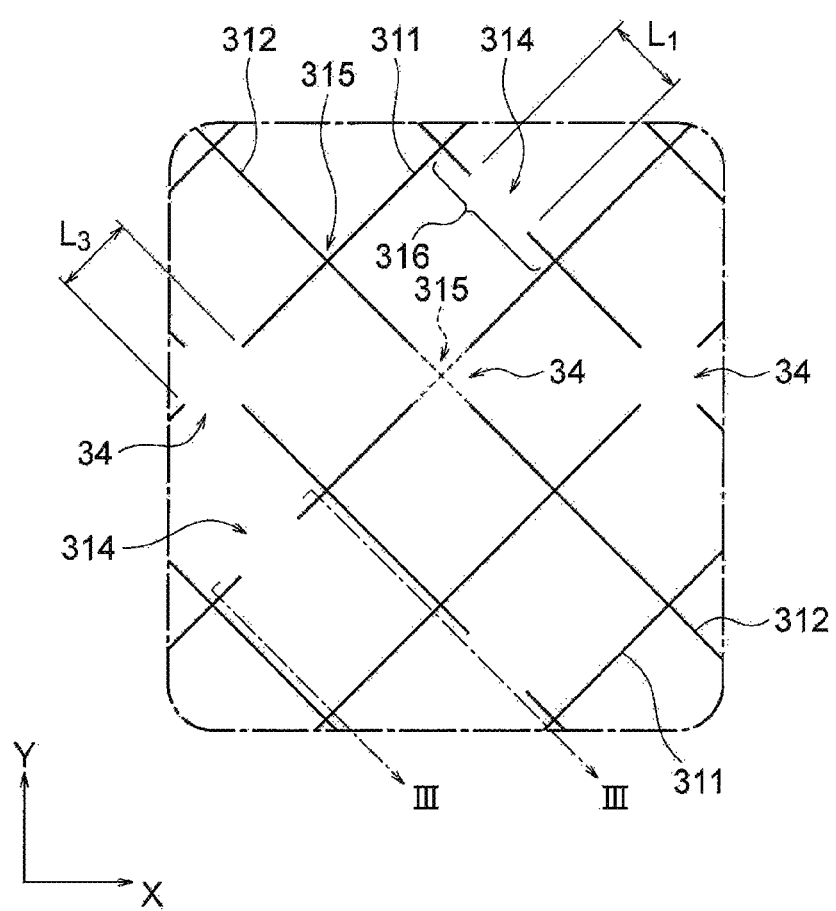
FIG. 2 is an enlarged plan diagram illustrating part II in FIG. 1.
Figure 3:
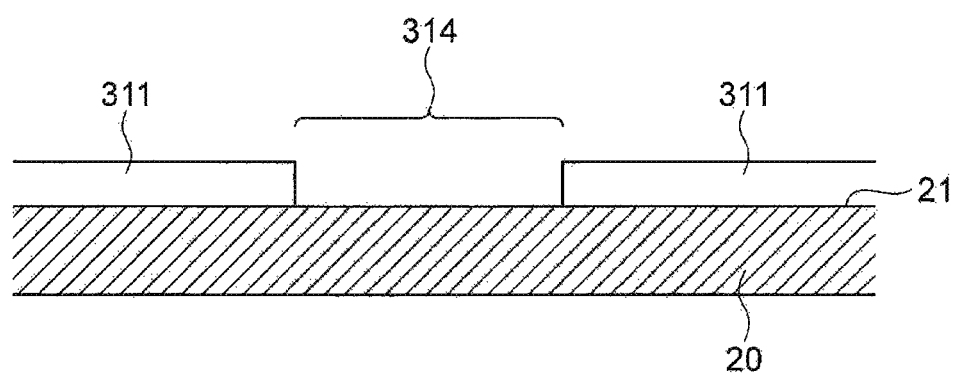
FIG. 3 is a cross-sectional diagram taken along a line III-III in FIG. 2.
Figure 4:
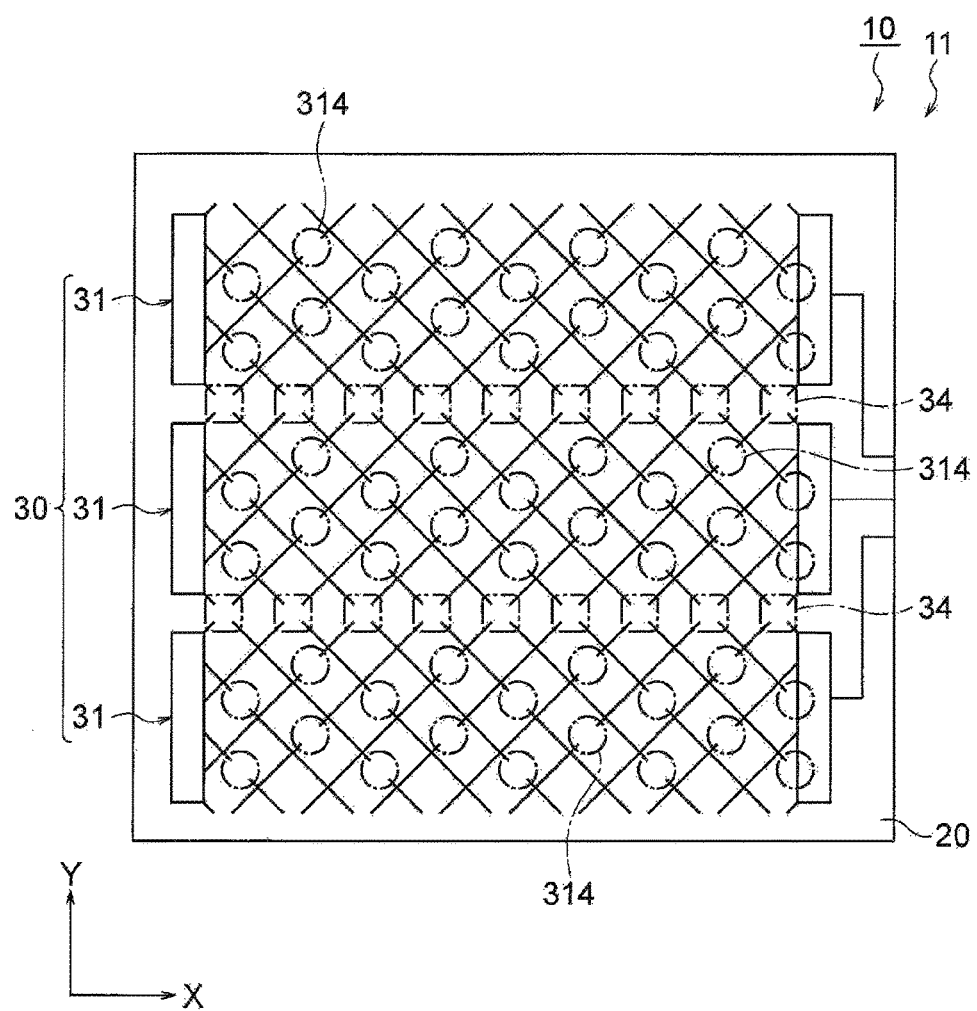
FIG. 4 is a diagram when first and second disconnection portions are marked in FIG. 1.

FIG. 1 is a plan diagram illustrating a wiring board according to a first embodiment of the invention. FIG. 2 is an enlarged plan diagram illustrating part II in FIG. 1. FIG. 3 is a cross-sectional diagram taken along a line III-III in FIG. 2. FIG. 4 is a diagram when first and second disconnection portions are marked in FIG. 1.

As illustrated in FIGS. 1 to 3, a wiring board 10 (wiring body 11) according to the embodiment includes a transparent board 20 and a conductor pattern 30 provided on the transparent board 20. The wiring board 10 according to the embodiment corresponds to an example of a wiring board according to the invention, the wiring body 11 according to the embodiment corresponds to an example of a wiring body according to the invention, the transparent substrate 20 according to the embodiment corresponds to an example of an insulating layer according to the invention, and the conductor pattern 30 according to the embodiment corresponds to an example of a conductor pattern according to the invention.

The transparent substrate 20 is a transparent substrate which is capable of transmitting visible light and has an electrical insulating property. As specific examples of a material constituting the transparent substrate 20, for example, resin materials such as polyethylene terephthalate (PET), polyethylene naphthalate (PEN), polyethylene (PE), polypropylene (PP), polystyrene (PS), ethylene-vinyl acetate copolymer resin (EVA), a vinyl resin, polycarbonate (PC), polyamide (PA), polyimide (PI), polyvinyl alcohol (PVA), an acrylic resin, and triacetyl cellulose (TAC) may be exemplified. In addition, the transparent substrate 20 may be configured with, for example, a glass instead of the resin material.

As illustrated in FIG. 1, the conductor pattern 30 includes three stripe-shaped detection electrodes 31, end connection lines 32 provided to two ends of each detection electrode 31, and lead wires 33 extracted from the one-side (right side in the figure) end connection lines 32. As illustrated in FIG. 3, the conductor pattern 30 is provided on a top surface 21 of the transparent substrate 20. In addition, the number of detection electrodes 31 constituting the conductor pattern 30 is not particularly limited.

As illustrated in FIGS. 1 and 2, each detection electrodes 31 is configured by first fine wires 311 and 312 having a conductive property and intersecting each other. The detection electrodes 31 have a mesh shape where diamond shapes are repeated as a whole. The detection electrode 31 according to the embodiment corresponds to an example of a detection electrode according to the invention, and the first fine wires 311 and 312 according to the embodiment correspond to examples of a first fine wire according to the invention.

More specifically, the one-side first fine wires 311 are extended in a straight line shape in a direction (hereinafter, simply referred to as "first direction") having an angle of substantially +45 degrees with respect to the X axis direction, and a plurality of the first fine wires 311 are arranged in parallel at an equal pitch $P_1$ in a direction (hereinafter, simply referred to as a "second direction") substantially perpendicular to the first direction. The other-side first fine wires 312 are also extended in a straight line shape in the second direction, and a plurality of the first fine wires 312 are arranged in parallel at an equal pitch $P_2$ in the first direction. In addition, the mesh-shaped detection electrodes 31 where diamond-shaped unit meshes 313 are repeated are formed by arranging the first fine wires 311 and 312 to be perpendicular to each other. The unit mesh 313 of the detection electrode 31 according to the embodiment corresponds to an example of a unit mesh of a detection electrode according to the invention.

In addition, the number or arrangement of unit meshes 313 included in the detection electrode 31 are not particularly limited. In addition, in the embodiment, although the pitch $P_1$ of the first fine wires 311 and the pitch $P_2$ of the first fine wires 312 are set to be substantially equal to each other ($P_1=P_2$), the pitches are not particularly limited. The pitch $P_1$ of the first fine wires 311 and the pitch $P_2$ of the second fine wires 312 may be set to be different from each other ($P_1 \neq P_2$). In addition, the angle of the first direction with respect to the X axis and the angle of the second direction with respect to the X axis may be set to be different from the angles described above.

As the unit mesh 313 included in the detection electrode 31, shapes other than the diamond shape may be used. More specifically, a triangle, a rectangle other than the diamond, a n-polygon such a hexagon, a circle, an ellipse, a star shape, or the like may be used as the unit mesh 313, and among these shapes, multiple shapes may be used as the unit meshes 313. In addition, the side of the unit mesh 313 may have a shape other than a straight line, and for example, the side of the unit mesh 313 may be a curved line, a wavy line, a zigzag line, or the like.

In addition, as illustrated in FIGS. 1 to 4, in the detection electrode 31 according to the embodiment, first disconnection portions 314 are included in the mesh shape. In the first disconnection portions 314, the first fine wires 311 and 312 are removed (namely, in the first disconnection portions 314, the first fine wires 311 and 312 are not formed), and the first fine wires 311 and 312 are electrically disconnected by the first disconnection portions 314. The first disconnection portions 314 are formed in parts except intersection points 315 of the first fine wires 311 and 312. More specifically, the first disconnection portions 314 are formed at centers of sides 316 between the intersection points 315 in the first fine wires 311 and 312.

In addition, in FIG. 4, positions surrounded by circle frames of one-dot dashed line indicate the first disconnection portions 314, and positions surrounded by square frames of one-dot dashed line indicate third disconnection portions 34 (described later). In addition, the first disconnection portion 314 according to the embodiment corresponds to an example of a first disconnection portions, the intersection point 315 of the first fine wires 311 and 312 according to the embodiment corresponds to an example of an intersection point first fine wires according to the invention, and the sides 316 of the first fine wires 311 and 312 according to the embodiment correspond to examples of a side of a first fine wire according to the invention. In the specification, the first to third disconnection portions 314, 355, and 34 including the later-described second and third disconnection portions 355 and 34 satisfy that the lengths $L_1$ to $L_3$ of the respective disconnection portions are 0.5 µm or more in the extension directions of the disconnection portions.

Since the first disconnection portions 314 are formed in the detection electrodes 31, it is possible to prevent boundary lines between a plurality of the detection electrodes 31 from being conspicuous, and it is possible to improve the visibility of the touch panel 1 using the wiring board 10. In addition, since the aperture ratio of the detection electrode 31 can be increased by forming the first disconnection portions 314 in the detection electrode 31, in the touch panel including the wiring board 10, a change in electrostatic capacitance can be increased, so that it is possible to improve sensitivity.

In addition, the first disconnection portions 314 are formed in the sides of the unit mesh 313 configured by the first fine wires 311 and 312, so that, in comparison with a case where the first fine wires 311 and 312 are disconnected by the intersection points 315, it is possible to secure many conduction paths for the detection electrode 31, and thus, it is possible to suppress an increase in electric resistance value.

In addition, since the first disconnection portions 314 are formed at the centers of the sides 316 of the unit mesh 313 configured by the first fine wires 311 and 312, in comparison with a case where the first disconnection portions 314 are formed in parts except the centers of the sides 316 of the unit mesh 313 configured by the first fine wires 311 and 312, the visibility of the touch panel 1 is further improved.

In the embodiment, one first disconnection portion 314 is formed for one unit mesh 313. If a plurality of the first disconnection portions 314 are formed for one unit mesh 313, in some cases, the detection electrode 31 may be dissevered and completely disconnected by the first disconnection portions 314. On the contrary, only one first disconnection portions 314 is formed for one unit mesh 313, so that it is possible to prevent the detection electrode 31 from being dissevered by the first disconnection portions 314.

A unit mesh 313 where the first disconnection portion 314 is not formed may exist. If electric conduction to two ends (namely, end connection lines 32) of the detection electrode 31 can be secured, a unit mesh 313 where a plurality of the first disconnection portions 314 are formed may exist within the detection electrode 31. Namely, the first disconnection portions 314 may not be formed in a regular manner.

As illustrated in FIGS. 1 and 4, a plurality of the detection electrodes 31 are arranged so that the intersection points 315 of the first fine wires 311 and 312 which the detection electrodes 31 adjacent to each other respectively include (strictly, virtual intersection points 315 (refer to FIG. 2) existing on the extension lines of the first fine wires 311 and 312 which the detection electrodes 31 adjacent to each other respectively include) are coincident with each other. For this reason, mesh shapes of a plurality of the detection electrodes 31 are provided over the entire conductor pattern 30.

In addition, in the embodiment, third disconnection portions 34 are formed at the intersection points 315 of the first fine wires 311 and 312 which the detection electrodes 31 adjacent to each other respectively include. In the third disconnection portions 34, the first fine wires 311 and 312 are removed (namely, in the third disconnection portions 34, the first fine wires 311 and 312 are not formed), and thus the detection electrodes 31 adjacent to each other are electrically insulated from each other by the third disconnection portions 34.

Since the third disconnection portions 34 are formed at the intersection points 315 between the detection electrodes 31, it is possible to efficiently disconnect the detection electrodes 31 by a small number of the third disconnection portions 34. Thus, it is possible to prevent boundary lines between a plurality of the detection electrodes 31 from being conspicuous.

In the embodiment, a length $L_1$ of the first disconnection portion 314 formed in the detection electrode 31 is substantially equal to a length $L_3$ of third disconnection portion 34 separating the detection electrodes 31 ($L_1=L_3$). Therefore, since the third disconnection portions 34 are covered under the first disconnection portions 314 so as not to be conspicuous, it is possible to further improve the visibility of the touch panel 1 including the wiring board 10.

The conductor pattern 30 is formed by printing a conductive paste on the transparent substrate 20 and performing curing. As the conductive paste, for example, a mixture of metal particles of silver (Ag), copper (Cu), or the like and a binder such as polyester or polyphenol may be exemplified. In addition, as the method of printing the conductive paste, for example, screen printing, gravure offset printing, ink-jet printing, and the like may be exemplified.

In the embodiment, when the conductor pattern 30 is formed by the above-described printing method, the conductive paste is not printed at positions corresponding to the first disconnection portions 314 on the transparent substrate 20, so that the first disconnection portions 314 are formed in the detection electrode 31. Similarly, the conductive paste is not printed at positions corresponding to the third disconnection portions 34 on the transparent substrate 20, the third disconnection portions 34 are formed between the detection electrodes 31.

For example, the conductor pattern 30 may be formed by patterning a metal layer laminated on the transparent substrate 20 and patterned in a mesh shape. Alternatively, the conductor pattern 30 may be formed on the transparent substrate 20 by using a sputtering method, a vacuum deposition method, a chemical vapor deposition (CVD) method, an electroless plating method, an electrolytic plating method, or a combination thereof.

The first and third disconnection portions 314 and 34 may be formed by forming a uniform mesh-shaped electrode where the first and third disconnection portions 314 and 34 are not formed and, after that, partially removing the first fine wires 311 and 312.

Figure 5:
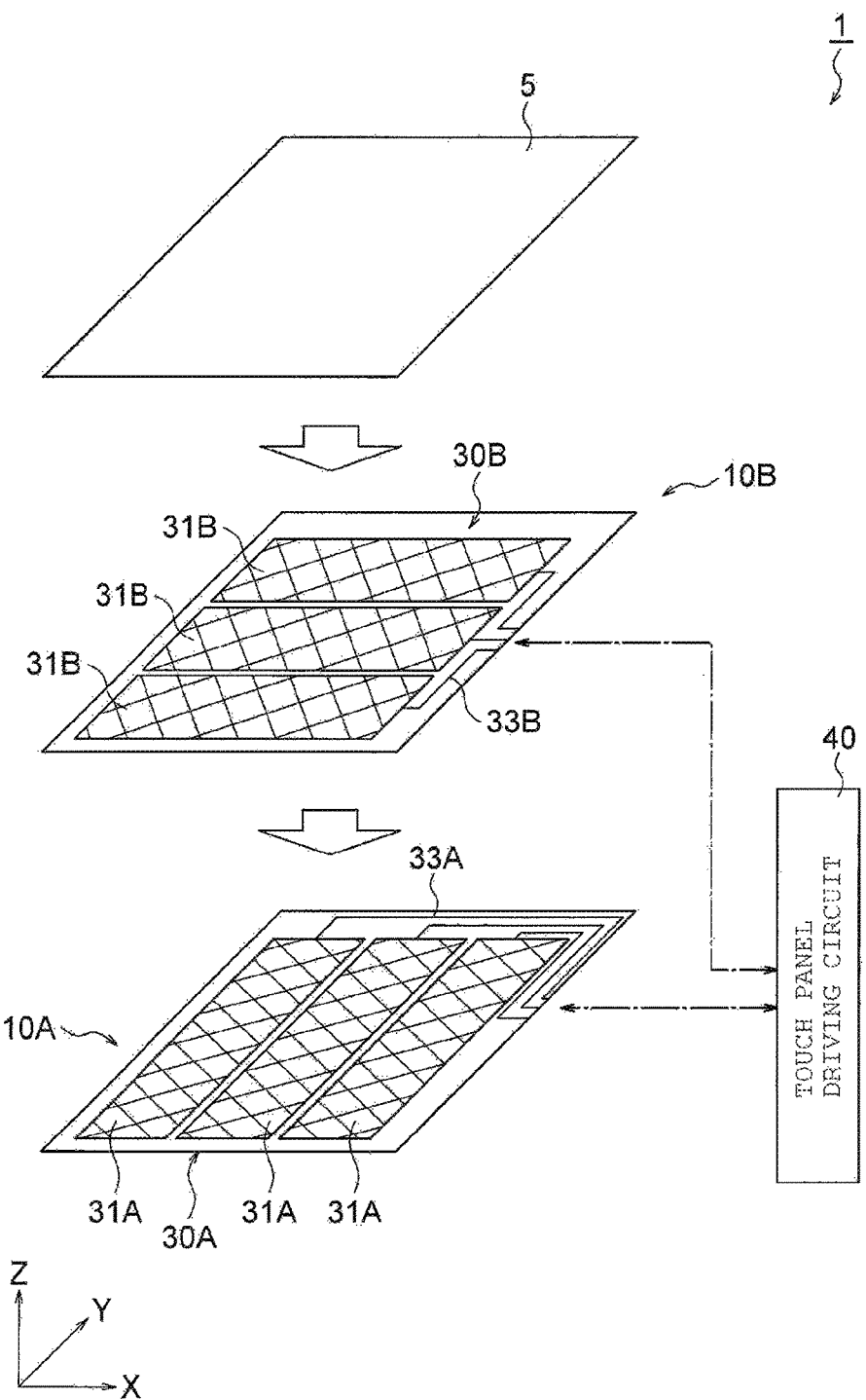
FIG. 5 is an exploded perspective diagram illustrating a touch panel using the wiring board according to the first embodiment of the invention.

Next, a structure of a touch panel 1 including the wiring board 10 described above will be described with reference to FIG. 5. FIG. 5 is an exploded perspective diagram illustrating a touch panel according to the embodiment. The touch panel 1 described hereinafter is an electrostatic-capacitancetype touch panel. However, the touch panel is not limited, but for example, a resistive-film-type touch panel may be used as the wiring board 10.

The touch panel 1 in the embodiment is used as an input device for an electronic apparatus such as a PC, a tablet information terminal, a smartphone, or a car navigation system. In such an electronic apparatus, the touch panel 1 is arranged on a display device such as a liquid crystal display. When a selection item of a screen displayed on the display device is directly touched by a manipulator's finger or is touched by using a dedicated pen, the selection item can be selected.

As illustrated in FIG. 5, the touch panel 1 is configured to include a cover member 5 and two wiring boards 10A and 10B. The first wiring board 10A and the second wiring board 10B are adhered to each other through a transparent adhesive layer, and the cover member 5 and the second wiring board 10B are also adhered to each other a transparent adhesive layer. As a specific example of an adhesive material constituting the transparent adhesive layer, for example, an acrylic adhesive material or the like may be exemplified.

Similarly to the above-described transparent substrate 20, the cover member 5 is a transparent substrate being capable of transmitting visible light and having an electrical insulating property. A top surface of the cover member 5 is an input surface which is to be in contact with a finger or a pen at the time of inputting by a manipulator.

The first wiring board 10A is configured by using the above-described wiring board 10. The first wiring board 10A includes a plurality (three in the embodiment) of stripe-shaped first electrodes 31A which are extended in the Y direction in FIG. 5, and a plurality of the first electrodes 31A are arranged to be parallel to each other. Similarly to the above-described electrodes 31, any one of the first electrodes 31A also has a mesh shape. In addition, a plurality of the first electrodes 31A are electrically connected to a touch panel driving circuit 40 through first lead wires 33A, respectively.

The second wiring board 10B is also configured by using the above-described wiring board 10. The second wiring board 10B includes a plurality (three in the embodiment) of stripe-shaped second electrodes 31B which are extended in the X direction in FIG. 5, and a plurality of the second electrodes 31B are arranged to be parallel to each other. Similarly to the above-described electrodes 31, any one of second electrodes 31B also has a mesh shape. In addition, a plurality of the second electrodes 31B are electrically connected to the touch panel driving circuit 40 through second lead wires 33B respectively.

When overlapping the first wiring board 10A and the second wiring board 10B, it is preferable that the first disconnection portions 314 of the first and second wiring boards 10A and 10B not overlap each other, so that the visibility of the touch panel 1 is improved.

The touch panel driving circuit 40, for example, periodically applies a predetermined voltage between the first electrode 31A and the second electrode 31B and detects a position of the finger on the touch panel 1 based on a change in electrostatic capacitance for each intersection point of the first and second electrodes 31A and 31B.

The number of first electrodes 31A on the first wiring board 10A is not particularly limited. In addition, the number of second electrodes 31B on the second wiring board 10B is not particularly limited.

The first wiring board 10A may be arranged between the cover member 5 and the second wiring board 10B. Alternatively, the conductor pattern 30A (or 30B) may be formed on the cover member 5 instead of the transparent substrate 20. The conductor patterns 30A and 30B may be formed on the two surfaces of the one transparent substrate 20.

In the embodiment, since the first disconnection portions 314 are provided in parts except the intersection points 315 of the first fine wires 311 and 312 in the detection electrode 31, it is possible to improve the visibility while maintaining the reliability of electric connection of the touch panel 1.

Second Embodiment

Figure 6:
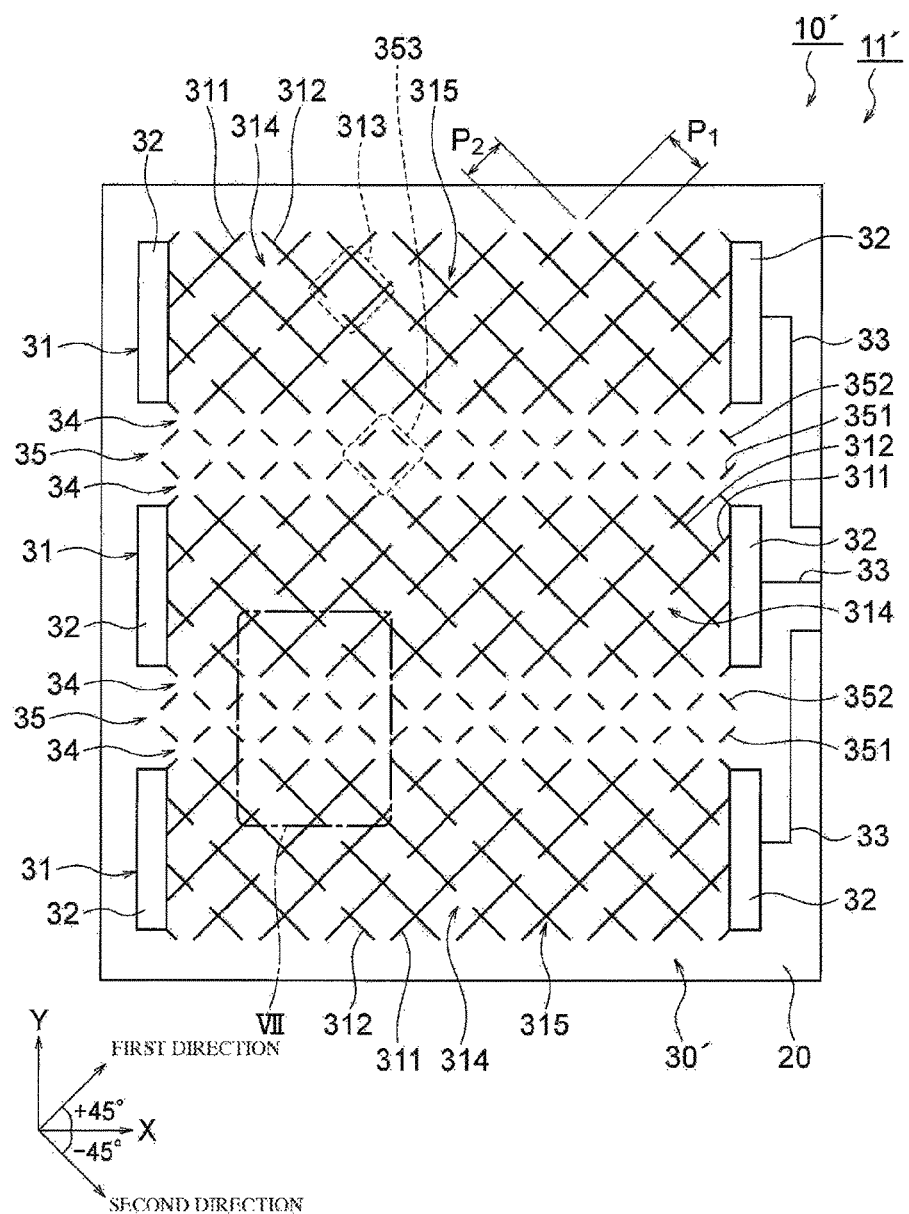
FIG. 6 is a plan diagram illustrating a wiring board according to a second embodiment of the invention.
Figure 7:
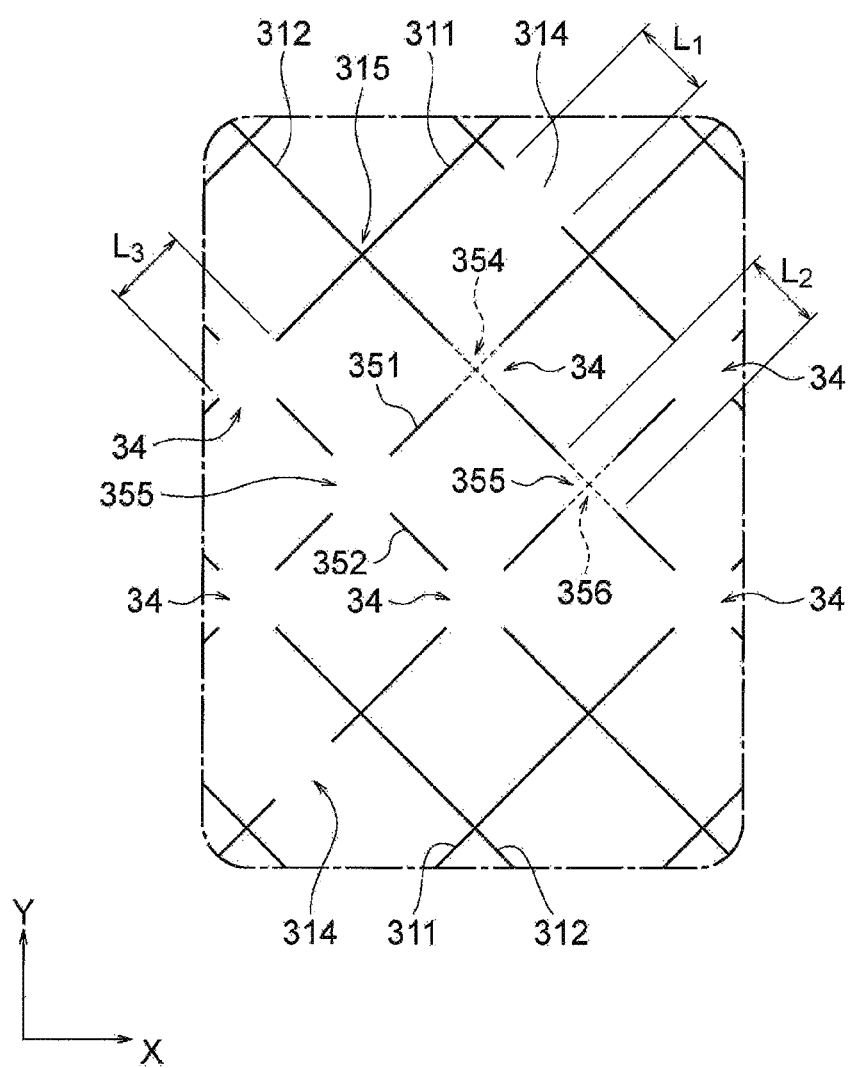
FIG. 7 is an enlarged plan diagram illustrating part VII in FIG. 6.
Figure 8:
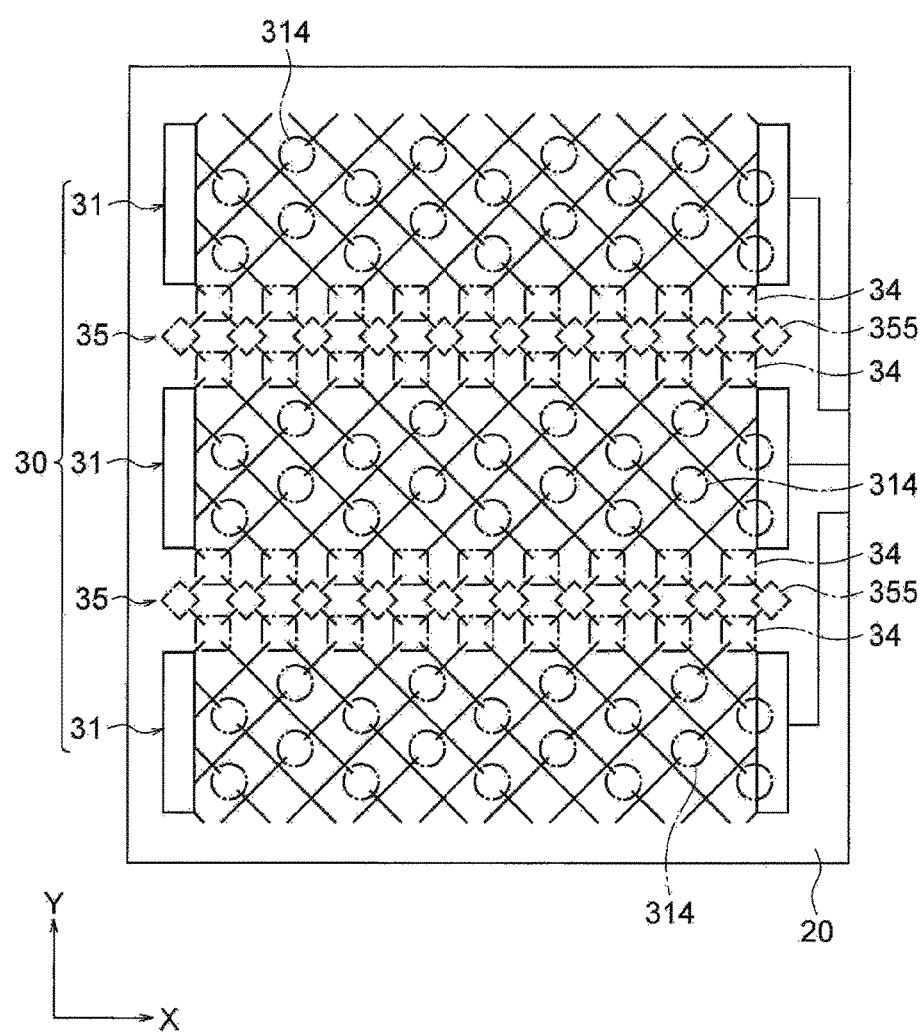
FIG. 8 is a plan diagram when first to third disconnection portions are marked in FIG. 6.

FIG. 6 is a plan diagram illustrating a wiring board according to a second embodiment of the invention. FIG. 7 is an enlarged plan diagram illustrating part VII in FIG. 6. FIG. 8 is a plan diagram when first to third disconnection portions are marked in FIG. 6.

In addition, in FIG. 8, positions surrounded by circle frames of one-dot dashed line indicates the first disconnection portions 314, positions surrounded by square frames of one-dot dashed line indicates the third disconnection portions 34, and positions surrounded by diamond-shaped frames of one-dot dashed line indicates the second disconnection portions 355 (described later).

In the embodiment, the configuration of the conductor pattern 30' is different from that of the first embodiment, but the other configurations are the same as those of the first embodiment. Hereinafter, only the different points of the wiring board 10' (wiring body 11') according to the second embodiment with respect to the first embodiment will be described. The same components as those of the first embodiment are denoted by the same reference numerals, and the description thereof is omitted.

The conductor pattern 30' in the embodiment includes strip-shaped dummy electrode 35 in addition to the detection electrodes 31, the end connection lines 32, and the lead wires 33. The configurations of the detection electrodes 31, the end connection lines 32, and the lead wires 33 are the same as those of the first embodiment described above, and the description thereof is omitted.

As illustrated in FIGS. 6 to 8, the dummy electrodes 35 are interposed between a plurality of the detection electrodes 31. The dummy electrodes are extended in a stripe shape in the same direction as the extending direction (the X direction in the figure) of the detection electrodes 31. Each dummy electrode 35 is configured by a plurality of second fine wires 351 and 352 having a conductive property and intersecting each other. The dummy electrode 35 has a mesh shape where diamond shapes are repeated as a whole. The dummy electrode 35 according to the embodiment corresponds to an example of a dummy electrode according to the invention, and the second fine wires 351 and 352 according to the embodiment correspond to examples of a second fine wire according to the invention.

More specifically, the one-side second fine wires 351 are extended in a straight line shape in a direction (hereinafter, simply referred to as a "first direction") having an angle of +45 degrees with respect to the X axis direction, and a plurality of the second fine wires 351 are arranged in parallel at an equal pitch $P_2$ in a direction (hereinafter, simply referred to as a "second direction") substantially perpendicular to the first direction. The other-side second fine wires 352 are also extended in a straight line shape in the second direction, and a plurality of the second fine wires 352 are arranged in parallel at an equal pitch $P_2$ in the first direction. In addition, the dummy electrodes 35 where diamond-shaped unit meshes 353 are repeated are formed by arranging the second fine wires 351 and 352 to be perpendicular to each other.

In the embodiment, the pitch $P_1$ of the second fine wires 351 is substantially equal to the pitch $P_1$ of the first fine wires 311, and the pitch $P_2$ of the second fine wires 352 is also substantially equal to the pitch $P_2$ of the second fine wires 312. As a result, the unit meshes 353 of the dummy electrode 35 have substantially the same shape as the unit meshes 313 of the detection electrode 31 described above.

In addition, the number or arrangement of unit meshes 353 included in the dummy electrode 35 are not particularly limited. The unit mesh 353 of the dummy electrode 35 according to the embodiment corresponds to an example of a unit mesh of a dummy electrode according to the invention.

As illustrated in FIGS. 6 and 8, the detection electrode 31 and the dummy electrode 35 are arranged so that the intersection points 354 of the first wires 311 and 312 which the detection electrode 31 includes and the intersection points 354 of the second fine wires 351 and 352 which the dummy electrode 35 adjacent to the detection electrode 31 is includes (strictly, virtual intersection points 354 (refer to FIG. 6) existing on the extension lines of the first wires 311 and 312 which the detection electrode 31 is includes and virtual intersection points 354 existing on the extension lines of second fine wires 351 and 352 which the dummy electrode 35 adjacent to the detection electrode 31 is includes) are coincident with each other. For this reason, mesh shapes of the detection electrode 31 and the dummy electrode 35 are provided over the entire second conductor pattern 30'.

In the embodiment, as illustrated in FIG. 7, third disconnection portions 34 are formed at the intersection points 354 of the first fine wires 311 and 312 which the detection electrode 31 is includes and second fine wires 351 and 352 which the dummy electrode 35 adjacent to the detection electrode 31 is includes. In the third disconnection portions 34, the first and second fine wires 311, 312, 351, and 352 are removed (namely, in the third disconnection portions 34, the first and second fine wires 311, 312, 311, and 312 are not formed). Thus, the detection electrode 31 and the dummy electrode 35 adjacent to each other are electrically disconnected from each other by the third disconnection portions 34. The third disconnection portion 34 according to the embodiment corresponds to an example of a third disconnection portion according to the invention.

Since the third disconnection portions 34 are formed at the intersection points 354 between the detection electrode 31 and the dummy electrode 35, it is possible to efficiently disconnect the detection electrode 31 and the dummy electrode 35 by a small number of the third disconnection portions 34. Thus, it is possible to prevent boundary lines between the detection electrode 31 and the dummy electrode 35 from being conspicuous.

As illustrated in FIGS. 6 to 8, the dummy electrode 35 in the embodiment includes second disconnection portions 355 in the mesh shape. In the second disconnection portions 355, the second fine wires 351 and 352 are removed (namely, in the second disconnection portions 355, the second fine wires 351 and 352 are not formed). Thus, the second fine wires 351 and 352 are electrically disconnected from each other by the disconnection portions 355. The second disconnection portions 355 are formed at intersection points 356 of the second fine wires 351 and 352. The second disconnection portion 355 according to the embodiment corresponds to an example of a second disconnection portion according to the invention.

Since the second disconnection portions 355 are formed in the dummy electrodes 35, the areas of the individual divided second fine wires 351 and 352 are reduced. Therefore, since electric charges are not easily induced, it is possible to improve the sensitivity of the touch panel using the wiring board 10.

In addition, since the second disconnection portions 355 are formed at the intersection points 356 in the dummy electrode 35, in comparison with a case where the second disconnection portions 355 are provided to the sides of the second fine wires 351 and 352, it is possible to efficiently disconnect the dummy electrodes 35 by a small number of the second disconnection portions 355, and it is possible to finely divide the dummy electrodes 35.

In the embodiment, a length $L_1$ of the first disconnection portion 314 formed in the detection electrode 31, a length $L_3$ of the third disconnection portions 34 separating the detection electrode 31 and the dummy electrode 35, and a length $L_2$ of the second disconnection portions 355 in the dummy electrode 35 are substantially equal to each other ($L1=L_2=L_3$). Therefore, since the third disconnection portions 34 are covered under the first disconnection portions 314 or the second disconnection portions 355 so as not to be conspicuous, it is possible to further improve the visibility of the touch panel using the wiring board 10'.

The dummy electrodes 35 are formed by printing a conductive paste on the transparent substrate 20 and performing curing. The dummy electrode can be formed simultaneously together with the detection electrodes 31, the end connection lines 32, and the lead wires 33. In the embodiment, when forming the conductor pattern 30' by using the above-described printing method, the conductive paste is not printed at positions corresponding to the second disconnection portions 355 on the transparent substrate 20, so that the second disconnection portions 355 are formed in the dummy electrode 35.

In the embodiment, similarly to the first embodiment described above, since the first disconnection portions 314 are formed in parts except the intersection points 315 of the first fine wires 311 and 312 in the detection electrode 31, it is possible to improve the visibility while maintaining the reliability of electric connection of the touch panel.

In the embodiment, the unit mesh included in the dummy electrode may not have the same shape as the unit mesh 313 of the electrode 31.

Figure 9:
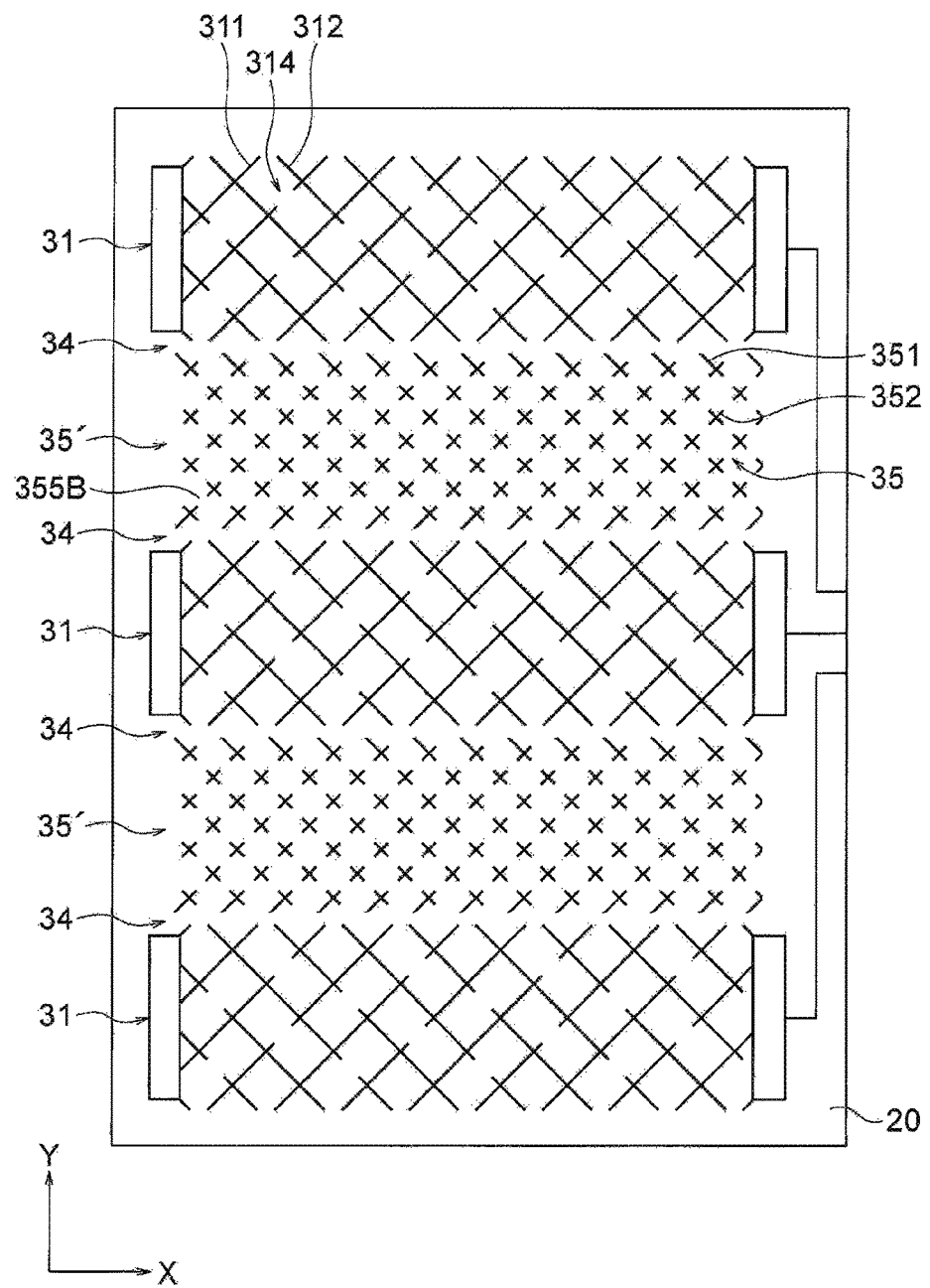
FIG. 9 is a plan diagram illustrating a wiring board according to still another embodiment of the invention.

FIG. 9 is a plan diagram illustrating a modified example of the wiring board according to the second embodiment of the invention. For example, as illustrated in FIG. 9, a unit mesh included in the dummy electrode 35' may have a smaller diamond shape than the unit mesh 313 of the detection electrode 31. In this case, since the dummy electrode 35' is further finely divided by the second disconnection portions 355, it is possible to further improve the sensitivity of the touch panel using the wiring board 10.

Similarly to the example illustrated in FIG. 9, second disconnection portions 355B may be formed in the sides of second fine wires 351 and 352 in the dummy electrode 35.

A unit mesh 353 where the second disconnection portion 355 is not formed may exist. A unit mesh 353 where a plurality of the second disconnection portions 355 are formed may exist within the dummy electrode 35. Namely, the second disconnection portions 355 may not be formed in a regular manner.

In the embodiment, the number of first disconnection portions 314 may be smaller than the number of second disconnection portions 355.

Third Embodiment

Figure 10:
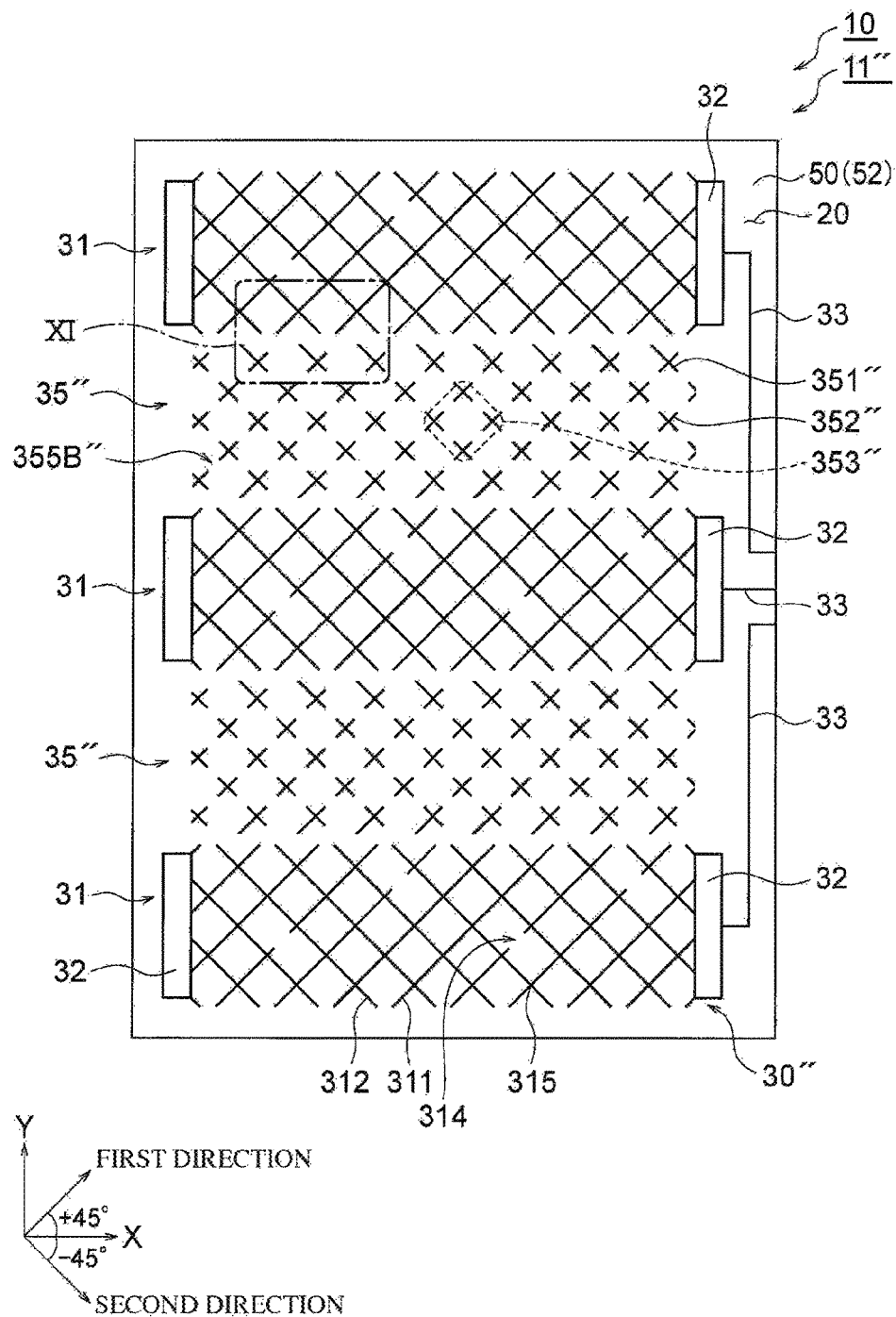
FIG. 10 is a plan diagram illustrating a wiring board according to a third embodiment of the invention.

FIG. 10 is a plan diagram illustrating a wiring board according to the third embodiment of the invention. FIG. 11 is an enlarged plan diagram illustrating an XI portion in FIG. 10.

The embodiment is different from the first embodiment in that a wiring board 10" includes a wiring body 11" and a transparent substrate 20 and the wiring body 11" includes an adhesive layer 50 and a conductor pattern 30", and the other configurations are the same as those of the first embodiment. Hereinafter, the adhesive layer 50 included the wiring body 11" and the wiring board 10" in the third embodiment will be described. The same components as those of the first embodiment are denoted by the same reference numerals, and the description thereof is omitted. In addition, the wiring body 11" according to the embodiment corresponds to an example of a wiring body according to the invention, and the wiring board 10" according to the embodiment corresponds to an example of a wiring board according to the invention.

The adhesive layer 50 is a layer adhering and fixing the transparent substrate 20 and the conductor pattern 30" to each other. The adhesive layer 50 is provided on the entire top surface 21 of the transparent substrate 20. As the adhesive material constituting the adhesive layer 50, a UV curable resin such as an epoxy resin, an acrylic resin, a polyester resin, a urethane resin, a vinyl resin, a silicon resin, a phenol resin, or a polyimide resin, a thermosetting resin, thermoplastic resin, and the like may be exemplified. The adhesive layer 50 includes a supporting portion 51 (refer to FIG. 12(e)) supporting the conductor pattern 30" and a flat-shaped portion 52 (refer to FIG. 12(e)) which is provided between the supporting portion 51 and the top surface 21 of the transparent substrate 20 to cover the top surface 21. The supporting portion 51 and the flat-shaped portion 52 are integrally formed. The adhesive layer 50 according to the embodiment corresponds to an example of an insulating layer according to the invention, and the transparent substrate 20 according to the embodiment corresponds to an example of a base material according to the invention.

As illustrated in FIG. 10, the conductor pattern 30" according to the embodiment includes a detection electrodes 31, end connection lines 32, lead wires 33, and dummy electrodes 35". The configurations of the detection electrodes 31, the end connection lines 32 and the lead wires 33 are the same as those of the first embodiment described above, and the description thereof is omitted. Similarly to the above-described second embodiment, the detection electrode 31 and the dummy electrode 35" are electrically insulated from each other.

In the dummy electrode 35", a unit mesh 353" included in the dummy electrode 35" is formed in a diamond shape having substantially the same as the unit mesh 313 included in the detection electrode 31. In addition, in the dummy electrode 35", second disconnection portions 355B" are formed in the sides of the unit mesh 353" configured by the second fine wires 351" and 352".

The dummy electrode 35" according to the embodiment is different from the dummy electrode 35 in that the unit meshes 353" included in the dummy electrode 35" are shifted with respect to the unit meshes 313 included in the detection electrode 31 in the direction (namely, the X direction) perpendicular to the parallel-arrangement direction of the detection electrodes 31 and the dummy electrodes 35". Hereinafter, different points between the dummy electrode 35 and the dummy electrode 35" will be described in detail.

In the embodiment, the unit meshes 313 included in the detection electrode 31 and the unit meshes 353" included in the dummy electrode 35" are shifted from each other in the X direction as follows. Namely, the first fine wire 311 included in the detection electrode 31 are arranged so as not to be substantially coincident with virtual extension lines (indicated as broken lines in the figure) of the second fine wires 351" included in the dummy electrode 35". On the other, the first fine wires 312 included in the detection electrode 31 are arranged so as not to be substantially coincident with virtual extension lines (indicated as broken lines in the figure) of the second fines wires 352" included in the dummy electrode 35".

Since the unit meshes 313 included in the detection electrode 31 and the unit meshes 353" included in the dummy electrode 35" are arranged to be shifted from each other in the X direction, the detection electrode 31 and the dummy electrode 35" are prevented from approaching each other, so that it is possible to prevent the detection electrode 31 and the dummy electrode 35" from being short-circuited.

In the embodiment, the detection electrode 31 and the dummy electrode 35" are not separated from each other in the Y direction, but the unit meshes 313 and the unit meshes 353" are allowed not to be aligned in the X direction, so that the detection electrode and the dummy electrode are electrically insulated from each other. Therefore, since the third disconnection portions 34 are unnecessary, it is possible to miniaturize the wiring board 10" (wiring body 11) using the conductor pattern 30".

In addition, a unit mesh 313 where the first disconnection portion 314 is not formed may exist. In addition, if electric conduction to two ends (namely, end connection lines 32) of the detection electrode 31 can be secured, a unit mesh 313 where a plurality of the first disconnection portions 314 are formed may exist within the detection electrode 31. Namely, the first disconnection portions 314 may not be formed in a regular manner.

In addition, in the embodiment, in terms of suppression of electric resistance value, the ratio of the first disconnection portions 314 is preferably 1 or less over 4 of the unit meshes 353", more preferably 1 or less over 10 of the unit meshes 353". Herein, the ratio of the first disconnection portions 314 is preferably 1 or more over 50 of the unit meshes 353".

In addition, in the embodiment, the number of first disconnection portions 314 may be smaller than the number of second disconnection portions 355B". For example, it is preferable that a ratio of the first disconnection portion 314 to the second disconnection portions 355B" be set to be 1/16 or less and the conductivity of the detection electrode 31 is not impaired. It is more preferable that the ratio be 1/40 or less. In addition, if the ratio is 1/200 or more, it is possible to achieve the effect of improving the visibility.

In the embodiment, it is preferable that a length $L_2$ of the second disconnection portion 355B" in the extending direction be larger than a width of each of the second fine wires 351" and 352", and it is more preferable that the following Formula (1) be satisfied.

$$W_2 \times 5 \geq L_2 \tag{1}$$

In the Formula (1), $L_2$ denotes the length of the second disconnection portion 355B", and $W_2$ denotes the width of each of the second fine wires 351" and 352".

In the wiring board 10" according to the embodiment, the following Formula (2) is satisfied. Thus, a difference between the aperture ratio of the area where the detection electrode 31 is formed and the aperture ratio of the area where the dummy electrode 35" is formed can be reduced, so that it is possible to further improve the visibility of the touch panel 1 using the wiring board 10".

$$|A_1 - A_2| \leq 1 \tag{2}$$

In the Formula (2), $A_1$ denotes the aperture ratio of the detection electrode 31, and $A_2$ denotes the aperture ratio of the dummy electrode 35".

In the wiring board 10" according to the embodiment, in terms of further improvement of the visibility of the touch panel 1, it is more preferable that the following Formula (3) be satisfied.

$$|A_1-A_2| \leq 0.5 \quad (3)$$

More specifically, the width of each of the first and second fine wires 311, 312, 351", and 352" is set to 2 µm. A pitch $P_1$ as an inter-center distance between the first fine wires 311 and 311 and an inter-center distance between the second fine wires 351" and 351" is set to 92 µm. A pitch $P_2$ as an inter-center distance between the first fine wires 312 and 312 and an inter-center distance between the second fine wires 352" and 352" is set to 92 µm. A length $L_1$ of the first disconnection portion 314 and a length $L_2$ of the second disconnection portion 355B" are set to 5 µm. In the detection electrode 31, one first disconnection portion 314 is formed for one unit mesh 313. On the other hand, in the dummy electrode 35", four second disconnection portions 355B" are formed for one unit mesh 353".

In the above case, the aperture ratio $A_1$ of the detection electrode 31 is 95.67%, and in contrast, the aperture ratio $A_2$ of the dummy electrode 35" is 95.89%. Namely, the absolute value of a difference between the aperture ratio $A_1$ of the detection electrode 31 and the aperture ratio $A_2$ of the dummy electrode 35" is 0.22% ($|A_1-A_2|=0.22$). In this manner, the wiring board 10" satisfies the above Formula (3), so that the visibility of the touch panel 1 is further improved.

In addition, it is preferable that the above Formulas (1) to (3) be satisfied in the wiring board 10' (wiring body 11') described in the second embodiment.

In addition, in the embodiment, the extending directions of the first and second fine wires 311 and 351" are the first direction, and the extending directions of the first and second fine wires 312 and 352" are the second direction. However, the angle of the first direction with respect to the X axis or the angle of the second direction with respect to the X axis may be an angle different from the angle described in the first embodiment.

The conductor pattern 30" in the embodiment may be configured with the same material as the material constituting the conductor pattern 30 described in the first embodiment, but it is not particularly to the material described above. More specifically, as the conductive paste constituting the conductor pattern 30", besides metal particles, a conductive powder or a metal salt may be used. As the conductive powder, a metal such as silver, copper, nickel, tin, bismuth, zinc, indium, or palladium, a graphite, and the like may be exemplified. As the metal salt, salts of the metals may be exemplified. In addition, as the binder which is to be mixed with the conductive paste, besides the above-described material, an acrylic resin, an epoxy resin, a vinyl resin, a urethane resin, a phenol resin, a polyimide resin, and the like may be used.

Next, a method of manufacturing the wiring board 10" will be described in detail. FIG. 12(a) to FIG. 12(e) are plan diagrams illustrating a method of manufacturing the wiring board according to the third embodiment of the invention.

Figure 12A:
FIGS. 12(a) to 12(e) are plan diagrams illustrating a method of manufacturing the wiring board according to the third embodiment of the invention.

First, as illustrated in FIG. 12(a), an intaglio plate 60 where recess portions 61 having a shape corresponding to the shape of the conductor pattern 30" are formed is prepared. As a material constituting the intaglio plate 60, nickel, silicon, silicon dioxide, organic silicas, a glassy carbon, a thermoplastic resin, a light curable resin, or the like may be exemplified. A width of the recess portion 61 is typically in a range of 50 nm to 1000 µm, preferably in a range of 100 nm to 100 µm, more preferably in a range of 500 nm to 10 µm. In addition, a depth of the recess portion 61 is typically in a range of 50 nm to 3000 µm, preferably in a range of 100 nm to 100 µm, more preferably 500 nm to 10 µm.

In order to improve a demolding property, it is preferable that, on the surface of the recess portion 61, a demolding layer made of a graphite-based material, a silicone-based material, a fluorine-containing material, a ceramic-based material, an aluminum-based material, or the like be formed.

The recess portions 61 of the intaglio plate 60 is filled with a conductive material 70. As the conductive material 70, a conductive paste or a conductive ink configured by mixing a conductive powder or a metal salt, a binder, water or solvent, and various additives may be exemplified. As the above-described conductive powder, a metal such as silver, copper, nickel, tin, bismuth, zinc, indium, or palladium, graphite, and the like may be exemplified. As the metal salt, salts of the metals may be exemplified. As conductive particles contained in the conductive material 70, conductive particles having a diameter $\phi$ of, for example, 0.5 µm or more and 2 µm or less ($0.5 \leq \phi \leq 2$) according to the width of the to-be-formed conductor pattern may be used. In addition, it is preferable that conductive particles having an average diameter $\phi$ which is a half or less of the width of the to-be-formed conductor pattern be used.

As the binder contained in the conductive material 70, an acrylic resin, a polyester resin, an epoxy resin, a vinyl resin, a urethane resin, a phenol resin, a polyimide resin, and the like may be exemplified.

As the solvent contained in the conductive material 70, α-terpineol, butyl carbitol acetate, butyl carbitol, 1-decanol, butyl cellosolve, diethyleneglycol monoethyl etheracetate, tetradecane, and the like may be exemplified.

As the method of filling the recess portion 61 of the intaglio plate 60 with the conductive material 70, for example, a dispensing method, an ink-jet method, and a screen printing method may be exemplified. Alternatively, a method of wiping, scraping, suctioning, adhering-off, washing, or blowing the conductive material applied on the portions other than the recess portions after applying the conductive material by using a slit coating method, a bar coating method, a blade coating method, a dip coating method, a spray coating method, or a spin coating method may be exemplified. The method of filling the recess portion 61 of the intaglio plate 60 with the conductive material 70 may be appropriately used according to the composition or the like of the conductive material and the shape or the like of the intaglio plate. In the embodiment, in the intaglio plate 60, the recess portions 61 are not formed in the portions corresponding to the first and second disconnection portions 314 and 355B", the shapes corresponding to the first and second disconnection portions 314 and 355B" are formed in the conductor pattern 30".

Figure 12B:
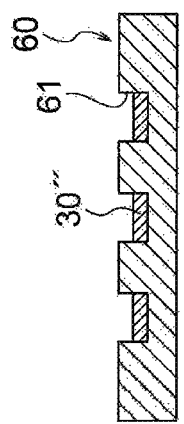

Next, as illustrated in FIG. 12(b), by heating the conductive material 70 filling the recess portions 61 of the intaglio plate 60, the conductor pattern 30" is formed. The heating condition of the conductive material 70 may be appropriately set according to composition and the like of the conductive material. By the heating process, the volume of the conductive material 70 is contracted.

In addition, the treatment method for the conductive material 70 is not limited to the heating. Irradiation of energy beams such as infrared rays, ultraviolet rays, or laser beams may be used, or only drying may be used. In addition, a combination of two or more of these treatment methods may be used.

Figure 12C:
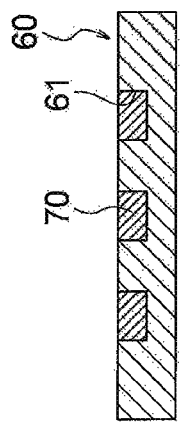
Figure 12D:
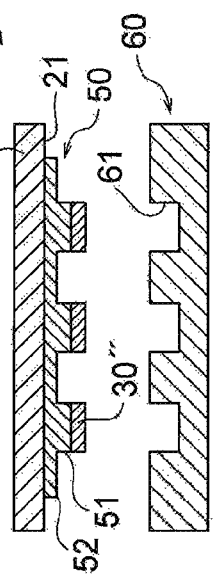
Figure 12E:
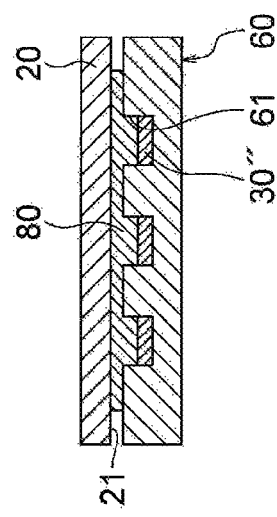

Subsequently, as illustrated in FIG. 12(c), a the transparent substrate 20 where the adhesive material 80 for forming the adhesive layer 50 is substantially uniformly coated is prepared. As the adhesive material 80, a UV curable resin such as an epoxy resin, an acrylic resin, a polyester resin, a urethane resin, a vinyl resin, a silicon resin, a phenol resin, or a polyimide resin, a thermosetting resin, a thermoplastic resin, or the like may be exemplified.

In addition, in terms of securing sufficient fluidity at the time of applying, it is preferable that a viscosity of the material constituting the adhesive layer 50 be a range of 1 mPa·s to 10,000 mPa·s. In addition, in terms of durability of the conductor pattern 30", it is preferable that a storage elastic modulus of the resin after curing be $10^6$ Pa or more and $10^9$ Pa or less.

As the method of coating the transparent substrate 20 with the adhesive material 80, a screen printing method, a spray coating method, a bar coating method, a dip method, an ink-jet method, and the like may be exemplified.

Next, the transparent substrate 20 and the adhesive material 80 are arranged on the intaglio plate 60, and the transparent substrate 20 and the adhesive material 80 are pressed against the intaglio plate 60 so that the adhesive material 80 is inserted into the recess portions 61 of the intaglio plate 60, and the adhesive material 80 is cured. A pressing forcing of pressing the transparent substrate 20 and the adhesive material 80 against the intaglio plate 60 is preferably in a range of 0.001 MPa to 100 MPa, more preferably in a range of 0.01 MPa to 10 MPa. In addition, the pressing may be performed by using a pressing roller or the like. Therefore, the adhesive layer 50 is formed, and the transparent substrate 20 and the conductor pattern 30" are bonded and fixed to each other through the adhesive layer 50.

The method of curing the adhesive material 80 and the like may be appropriately performed according to composition and the like of the adhesive material 80. For example, heating may be performed, only drying may be performed, and energy beams such as infrared rays, ultraviolet rays, or laser beams may be irradiated. In addition, a combination of two or more of the treatment methods may be used. In a case where a thermoplastic material is used as the adhesive material 80, the adhesive layer 50 may be formed by applying heat or the like to melt and, after that, cooling.

The method of forming the adhesive layer 50 is not limited to the above-described method. For example, the adhesive layer 50 may be formed by applying the adhesive material 80 on the intaglio plate 60 (the intaglio plate 60 in the state illustrated in FIG. 12(b)), arranging the transparent substrate 20 on the adhesive material 80, and, after that, curing the adhesive material 80 in the state that the transparent substrate 20 is arranged on the intaglio plate 60 and is pressed to the intaglio plate 60.

Next, the transparent substrate 20, the adhesive layer 50, and the conductor pattern 30 are demolded from the intaglio plate 60, so that the wiring board 10" including the wiring body 11" according to the embodiment is obtained.

The embodiments described above are disclosed for the better understanding of the invention, but the embodiments are not provided to limit the invention. Therefore, it is intended that each component disclosed in the embodiments described above also includes all design changes or equivalents included in the scope of the invention.

In the embodiments described above, the examples where the wiring board is applied to the touch panel are described, the input device to which the wiring board is applied is not limited.

For example, the above-described wiring board 10 may be applied to a touch switch. As a specific example of the touch switch, for example, a switch of switching ON/OFF on the basis of a change in electrostatic capacitance involved with approaching or separating of manipulator's finger or a pen may be exemplified.

In addition, the wiring board having conductor patterns 30 and 30' described in the first and second embodiments may be manufactured by using the method of manufacturing the wiring board described in detail in the third embodiment. In this case, as the materials constituting the conductor patterns 30 and 30', the materials exemplified in the third embodiment may be used.

In addition, in the case of using the method of manufacturing the wiring board described in the third embodiment, the touch panel 1 is not limited to the configuration (refer to FIG. 5) including the wiring board 10A including the conductor pattern 30A and the wiring board 10B including the conductor pattern 30B. More specifically, the touch panel may be configured with a wiring board (so-called a one-side board) including a wiring body where two layers of conductor patterns are formed at a one-side main surface side of a base material. The wiring board is manufactured as follows.

Namely, after a wiring board 10" is manufactured by the method described above in the third embodiment, a resin layer covering the conductor pattern 30" is further formed. Next, a conductor pattern is further formed so as to face the conductor pattern 30" with the formed resin interposed.

As a method of forming the resin layer in the example, the same method of forming the adhesive layer 50 described above in the third embodiment may be exemplified. The conductor pattern in the example is formed by the same method as the method of forming the conductor pattern 30" described above in the third embodiment. Next, the resin layer in the example formed on the wiring board 10" is pressed against the conductor pattern, and the resin layer is cured, so that the conductor pattern is formed on the resin layer. In addition, in the example, the method of forming the conductor pattern on the resin layer is not particularly limited to the method described above. For example, after the resin layer in the example formed on the wiring board 10" is cured, the conductor pattern in the example may be formed on the resin layer by using the method of forming the conductor pattern 30 described above in the first embodiment.

By doing so, it is possible to obtain the wiring board including the wiring body where two layers of the conductor patterns are formed in the one-side main surface side of the transparent substrate 20. The touch panel may include the wiring board.

In addition, for example, the transparent substrate 20 may be omitted from the wiring board 10" described above in the third embodiment. For example, the wiring body or the wiring board may include a peeling sheet provided on a bottom surface of the adhesive layer 50. In this case, when the wiring body or the wiring board is mounted on a mounting object (a film, a surface glass, a polarizing plate, a display, or the like), peeling sheet is peeled off from the adhesive layer. In addition, in the embodiment, the adhesive layer 50 corresponds to an example of an insulating layer according to the invention, and the mounting object corresponds to an example of a base material according to the invention. In addition, the wiring body or the wiring board may include a second adhesive layer covering the conductor pattern 30". In this case, the wiring body or the wiring board may be mounted on the above-described mounting object through the second adhesive layer. In the embodiment, the second adhesive layer corresponds to an example of an insulating layer according to the invention, and the mounting object corresponds to a base material according to the invention.

In addition, the flat-shaped portion 52 of the adhesive layer 50 in the third embodiment described above may be used as the base material. In this case, the adhesive layer 50 corresponds to an example of an insulating layer and a base material according to the invention.

In addition, in the embodiment described above, the wiring body or the wiring board is described to be used as a touch sensor of a touch panel or the like. However, the use of the wiring body or the wiring board is not particularly limited. For example, the wiring body may be used as a resistance heater releasing heat by current conduction. In addition, a portion of the conductor pattern is grounded, so that the wiring body may be used as an electromagnetic shield. In addition, the wiring body may be used as an antenna.

In addition, the conductive pattern in the embodiments described above is configured with a conductive material and a binder resin. However, the binder resin may be omitted from the materials constituting the conductive pattern.

EXPLANATIONS OF LETTERS OR NUMERALS

1 Touch panel
5 Cover member
10, 10A, 10B, 10', 10" Wiring board
20 Transparent substrate
21 Top surface
11" Wiring body
30, 30A, 30B, 30', 30" Conductor pattern
31, 31A, 31B Detection electrode
311, 312 First fine wire
313 Unit mesh
314 First disconnection portions
315 Intersection point
316 Side
32 End connection line
33, 33A, 33B Lead wire
34 Third disconnection portions
35, 35', 35" Dummy electrode
351, 351", 352, 352" Second fine wire
353, 353" Nit mesh
354 Intersection point
355, 355B, 355B" Second disconnection portions
356 Intersection point
50 Adhesive layer
51 Supporting portion
52 Flat-shaped portion
40 Driving circuit
60 Intaglio plate
61 Recess portion
70 Conductive material
80 Adhesive material

The invention claimed is:
1. A wiring body comprising:
an insulating layer; and
a conductor pattern provided on the insulating layer, wherein the conductor pattern includes detection electrodes arranged to be parallel to each other, each of the detection electrodes has a mesh shape configured by first fine wires intersecting each other,
the detection electrode includes first disconnection portions formed in parts except first intersection points of the first fine wires,
the first disconnection portion is formed on a side between the first intersection points,
a first remaining portion of the side is between the first disconnection portion and one of the first intersection points, and
a second remaining portion of the side is between the first disconnection portion and the other of the first intersection points.

2. The wiring body according to claim 1, wherein the conductor pattern includes at least one dummy electrode interposed between the detection electrodes and having a mesh shape configured by second fine wires intersecting each other, and
the dummy electrode includes at least one second disconnection portion.

3. The wiring body according to claim 2, wherein the dummy electrode includes second unit meshes having substantially the same shape as first unit meshes included in the detection electrode.

4. The wiring body according to claim 3, wherein the first unit meshes and the second unit meshes are shifted from each other in a direction perpendicular to an arrangement direction of the detection electrode and the dummy electrode.

5. The wiring body according to claim 2, wherein a length of the second disconnection portion is larger than a width of the second fine wire.

6. The wiring body according to claim 5, wherein the following Formula (1) is satisfied, $$W_2 \times 5 \geq L_2 \tag{1}$$

in the Formula (1), $L_2$ denotes a length of the second disconnection portion, and $W_2$ denotes a width of the second fine wire.

7. The wiring body according to claim 2, wherein the following Formula (2) is satisfied, $$|A_1 - A_2| \leq 1 \tag{2}$$

in the Formula (2), $A_1$ denotes an aperture ratio of the detection electrode, and $A_2$ denotes an aperture ratio of the dummy electrode.

8. The wiring body according to claim 1, wherein the first disconnection portion is formed at a center of the side between the first intersection points.

9. The wiring body according to claim 1, wherein one of the first disconnection portions is formed for one of the first unit meshes.

10. The wiring body according to claim 1, wherein the conductor pattern includes
at least one third disconnection portion formed at a second intersection point of the first fine wires which the detection electrodes adjacent to each other respectively include.

11. The wiring body according to claim 2, wherein the conductor pattern includes at least one third disconnection portion formed at a third intersection point of the first wire which the detection electrode includes and second fine wire which the dummy electrode adjacent to the detection electrode includes.

12. A wiring board comprising the wiring body according to claim 1, wherein
the insulating layer is a base material which supports the conductor pattern, or
the insulating layer is an adhesive layer with which the conductor pattern bonds to a base material.

* * * * *